(12) United States Patent
Marisetty et al.

(10) Patent No.: US 6,675,324 B2
(45) Date of Patent: Jan. 6, 2004

(54) RENDEZVOUS OF PROCESSORS WITH OS COORDINATION

(75) Inventors: Suresh Marisetty, San Jose, CA (US); George Thangadurai, Santa Clara, CA (US); Mani Ayyar, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/405,972

(22) Filed: Sep. 27, 1999

(65) Prior Publication Data

US 2003/0051190 A1 Mar. 13, 2003

(51) Int. Cl.[7] .................................................. G06F 11/00
(52) U.S. Cl. ............................. 714/30; 714/9; 714/10; 714/11; 714/12; 714/31
(58) Field of Search ............................... 714/30, 9, 10, 714/11, 12, 31, 26, 29, 13

(56) References Cited

U.S. PATENT DOCUMENTS

| | | | | |
|---|---|---|---|---|
| 5,522,029 A | * | 5/1996 | Hatfield | 714/12 |
| 5,884,019 A | * | 3/1999 | Inaho | 714/13 |
| 5,892,898 A | * | 4/1999 | Fujii et al. | 714/57 |
| 5,919,266 A | * | 7/1999 | Sud et al. | 714/13 |
| 6,065,078 A | * | 5/2000 | Falik et al. | 714/31 |
| 6,141,770 A | * | 10/2000 | Fuchs et al. | 714/11 |
| 6,173,386 B1 | * | 1/2001 | Key et al. | 714/38 |
| 6,199,179 B1 | * | 3/2001 | Kauffman et al. | 714/26 |
| 6,308,285 B1 | * | 10/2001 | Bowers | 714/10 |
| 6,360,333 B1 | * | 3/2002 | Jansen et al. | 714/25 |

OTHER PUBLICATIONS

Microsoft Press Computer Dictionary, Third Edition, 1997.*

* cited by examiner

Primary Examiner—Robert Beausoliel
Assistant Examiner—Michael Maskulinski
(74) Attorney, Agent, or Firm—Schwegman, Lundberg, Woessner & Kluth, P.A.

(57) ABSTRACT

A system comprises a non volatile memory and a plurality of processors. The non volatile memory stores an error handling routine. Each processor of the plurality of processors accesses the error handling routine on detecting an error and, on certain errors, signals the remaining processors to enter a rendezvous state. In the rendezvous state, a single processor takes over and performs error handling.

18 Claims, 5 Drawing Sheets

RENDEZVOUS OF PROCESSORS WITH OS COORDINATION

FIELD OF THE INVENTION

This invention relates generally to processor systems, and more particularly to error handling in processor systems.

BACKGROUND

Computer systems may have a number of layers of software, and there may be several processors in one system that are linked together by these layers. Further, a computer system may be made of a number of other computer systems linked together over a network, or a computer system may be one processor with a number of layers.

Thus, computer systems utilize layering of software. Generally, a layer of software will be responsible for handling a limited set of events or provide a certain level of abstraction. A layer of software is a set of instructions that are executed on a processor. A layer may control the hardware components of a system and provide higher level functionality to another layer, and a layer may handle networking functions at the lowest level. An example of such a layer is firmware. Firmware can be designed to interface with a certain type of processor.

Layers are arranged hierarchically in computer systems with one layer on top of another. Lower level layers are layers, such as firmware, that provide lower levels of abstraction. Higher level layers are layers, such as operating systems that provide higher level of abstraction. For example, a lower level layer may have to signal the read head on a hard drive and specify which platter to read data from to access data, whereas a higher level of software may just send a command to read a file to a lower level layer to access data.

Firmware is one type of lower layer in processor systems. Firmware refers to processor routines that are stored in non-volatile memory structures such as read only memories (ROMs), flash memories, and the like. These memory structures preserve the code stored in them even when power is shut off. One of the principle uses of firmware is to provide the routines that control a computer system when it is powered up from a shut down state, before volatile memory structures have been tested and configured. The process by which a computer is brought to its operating state from a powered down or powered off state is referred to as bootstrapping. Firmware routines may also be used to reinitialize or reconfigure the computer system following various hardware event and to handle certain platform events like system interrupts.

Firmware is typically written in assembly language. This is a low level computer language that provides direct access to processor hardware and is closely tied to the processor architecture. The processor architecture is reflected in the rest of the platform, in part because of the assembly level firmware that is used to initialize, configure, and service platform level resources. For example, platform resources may transfer data through specified registers and/or memory locations defined by the Instruction Set Architecture (ISA), and platform level interrupts may be handled by referring to specified processor registers. Thus, initialization and configuration of platform level resources are tied to the ISA of the underlying processor.

Operating systems (OS) are another layer of software. Operating systems are a higher layer than firmware. Operating systems interact with firmware to provide an environment in which applications can be run. Some examples of operating systems are DOS, Microsoft Windows, Microsoft Windows NT and Unix. By utilizing firmware, OS can be designed to run on many different processing systems without re-writing the OS for each variation in platforms. As an example, Microsoft Windows NT can run on single processor systems and some dual processor systems without recompiling or rewriting the OS. Operating systems can be designed to run on a variety of architectures. An Intel Architecture 64 bit operating system (IA-64 OS) is an operating system written using IA-64 code that runs all IA-64 applications (both IA-64 and IA-32 code). Two flavors of IA-64 OS are possible: one is a 32-bit IA-64 OS that uses 32 bits for its pointer variables and 64-bit IA-64 OS that uses 64 bits for its pointer variables. Such OS as have been described, allow applications to be written without regard for the underlying architecture.

By using layers of software, upper layers such as the OS and user applications in a multiprocessor system can interact with lower layers such as firmware as if the system is a single processor system. Layering permits software to be developed for a system without regard to the hardware making up the system, including the number of processors in that system.

In computer systems, different layers are responsible for detecting and handling different errors. Some layers may detect the error and tell a higher or lower layer of the error. Other layers may detect the error and handle the error.

In single processor systems, all layers are executing on the same processor. If an error occurs, that processor handles the error by executing the appropriate error handling hardware or routines. The error handling components or routines are part of the firmware or operating system.

In multiprocessor systems, sublayers or components of the firmware and operating system are executing on different processors. If an error is encountered by one processor, the other processors may continue executing without knowledge of the error. The error may be such that continued execution by the other processors propagates the error and causes further damage such as corrupted data. In a multiprocessor system, an error is more difficult to handle because the layers may not be able to communicate effectively. Furthermore, each processor may be executing separate firmware or firmware sublayers. Thus, an error in one processor may be detected by the firmware it is executing and the rest of the processors continue operating without knowledge of the error. This may cause the error to propagate and cause further errors in the system such as corrupting data.

Multiprocessor systems may have to reboot or shutdown for errors because of a lack of proper error handling. These errors may be handled in single processor based systems without shutting down.

For the reasons stated above, and for other reasons stated below which will become apparent to those skilled in the art upon reading and understanding the present specification, there is a need in the art for a microprocessor system which allows the use of multiple processors and appropriately handles system hardware and software errors.

SUMMARY

The present invention provides systems and methods for error handling on multiprocessor systems.

In accordance with the present invention, a system comprises a non volatile memory and a plurality of processors. The non volatile memory stores an error handling routine.

Each processor of the plurality of processors accesses the error handling routine on detecting an error and signals the remaining processors of the plurality of processors to enter a rendezvous state on certain errors.

A method comprises detecting an error. A rendezvous state is entered for correcting the error. The error is corrected and normal operation is resumed.

Other embodiments of systems and methods for error handling are disclosed.

DETAILED DESCRIPTION

The following discussion sets forth numerous specific details to provide a thorough understanding of the invention. However, those of ordinary skill in the art, having benefit of this disclosure, will appreciate that the invention may be practiced without these specific details. In addition, various well known methods, procedures, components, and circuits have not been described in detail in order to focus attention on the features of the present invention.

Multiprocessor systems are being used with increasing frequency. Multiprocessor systems provide systems that are more powerful than uniprocessor systems without requiring increases in operating frequency. These systems are often targeted to high end systems and servers. A variety of hardware system and software system errors can occur in multiprocessor systems. The hardware and software system errors can be handled by utilizing three different software layers. These layers are the processor abstraction layer (PAL), system abstraction layer (SAL) and the operating system (OS).

When certain errors are detected in a multiprocessor system, a single processor takes control of the system while other processors enter a rendezvous state. The single processor performs error handling and then releases the other processors from the rendezvous state.

Figure 1:
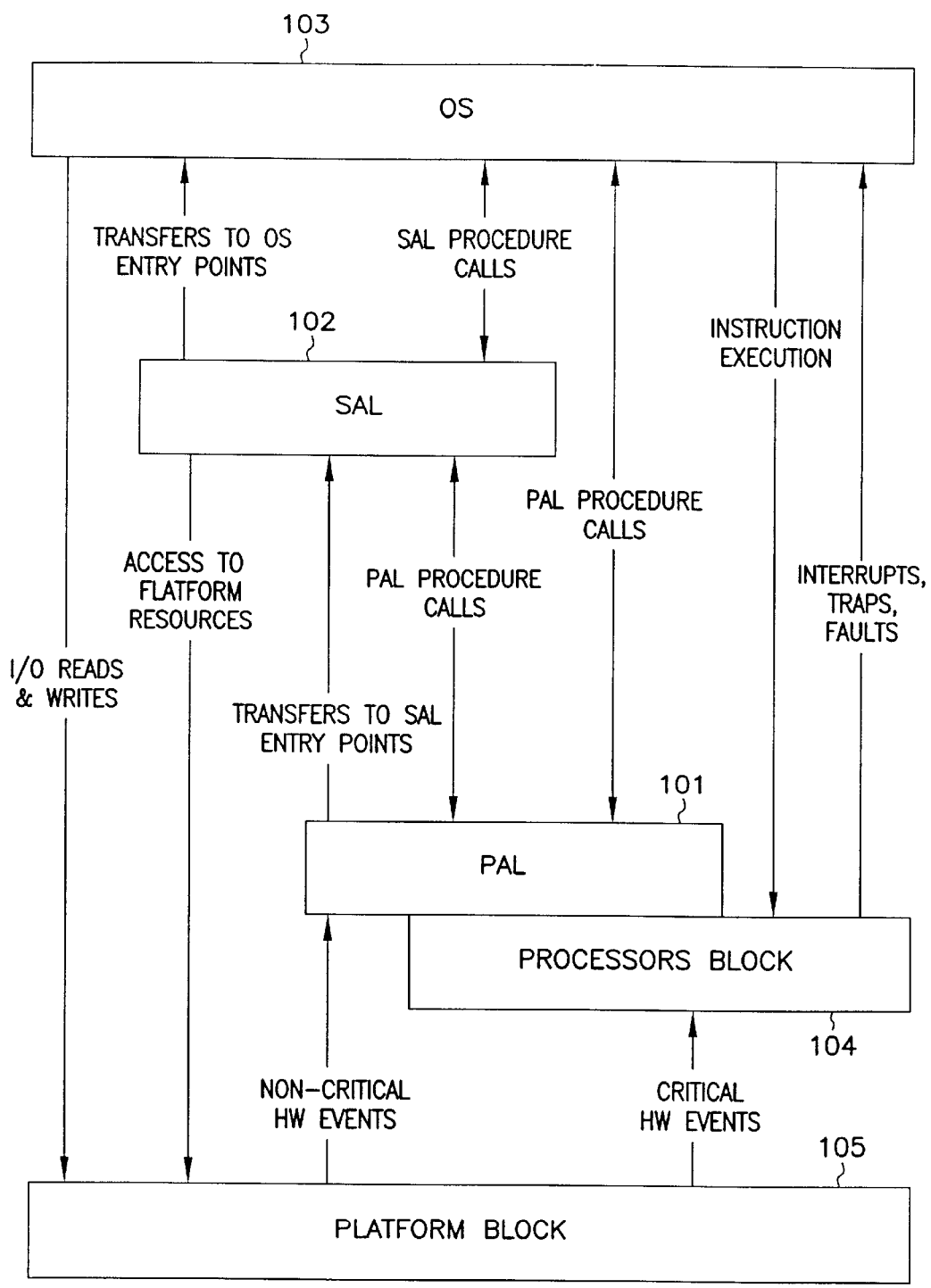
FIG. 1 illustrates is a multiprocessor system for error handling according to one embodiment of the present invention.

FIG. 1 illustrates a multiprocessor system for error handling. The system includes a PAL 101, SAL 102, OS 103, a plurality of processors 104, and platform hardware 105. The PAL 101 and SAL 102 can together be known as firmware because the code for these layer may reside on a non-volatile memory in the system such as flash read only memory (ROM). In the following discussion, we refer to PAL, SAL, and OS with the understanding that they represent PAL, SAL, or OS code executed by a processor.

The PAL 101 is the lowest level of the rendezvous layers and the firmware layers. PAL 101 is processor firmware that abstracts processor implementation differences. The PAL 101 also provides a large set of procedures for accessing processor hardware. PAL 101 can encapsulate processor model specific hardware. PAL 101 can provide a consistent interface to access processor resources across different processor implementations. Platform hardware events may trigger a processor to execute certain PAL 101 error handling routines. A processor executing routines of PAL 101 can access platform hardware 105 events which include events from hardware such as disk drives, memory, video cards and sound cards. The PAL 101 starts the handling of the error for processing and hands off that processing to upper firmware (SAL 102) and OS 103 layers. When certain errors occur, the processor implements a PAL routine to handle the error. If the PAL routine can not fully handle the error, the processor implements a SAL 102 routine or a OS 103 routine. Even where the processor may correct or handle the error using the PAL 101 routine, it may make error information available to other layers. The PAL can create an error log regarding its error handling and provide the error log to other layers. PAL 101 contains code or routines for error handling.

The SAL 102 includes routines that can access PAL 101 routines. SAL 102 can be a platform specific component provided by vendors. SAL 102 is the firmware layer that isolates the OS 103 and other higher level software from implementation differences in the platform. SAL 102 can be used to abstract system implementation differences in IA-64 platforms and may include the basic IA-32 BIOS and additional IA-64 routines to support the IA-64 platform. SAL 102 can create an error log and may request PAL 101 to sent its error log to SAL 102. SAL 102 contains code or routines for error handling.

The OS may access routines in the SAL and routines in the PAL. The OS 103 is coupled to SAL 102. The OS 103 may depend on SAL 102 to interact with PAL to get information about errors that occur. Or, the OS can make PAL procedure calls and SAL procedure calls. The OS 103 contains code or routines for error handling by a single processor.

For those errors that require handling by a single processor, the monarch processor is selected and the other processors enter an idle state. Once an error has been handled by the monarch processor, the other processors are awakened by the monarch processor executing SAL 102 or OS 103 routines.

For one embodiment, errors are divided into four categories ranging from least severe to most sever. These four categories cover all errors that might be encountered in a multiprocessor system.

The first category of errors are errors that can be corrected by the processor or the platform hardware 105 that encountered the error. This is the least severe error. The processor can correct this error and continue executing its current process. The current process continues without interruption and is unaware of the error condition. Continuable platform related errors which are errors that do not require shutting down the rest of the processors can also be detected and corrected by the platform hardware. An example of this type of error is a single bit ECC (error correcting code) error in the processor cache that is corrected by platform chipset hardware. These types of errors may be corrected without entering the rendezvous state.

The second category of errors are errors correctable using routines in PAL 101, SAL 102, and OS 103. Routines in these layers can be used to correct the error and the current processes executing can continue. The firmware or OS corrects the error and resumes execution of the offending process. The process may be interrupted but continues once the error has been corrected without being aware of the error. An example of this type of error is a parity error in the processor instruction cache. In this case, firmware will invalidate the entire instruction cache, access another copy of the instruction, and resume execution of the interrupted process. This type of error can be signaled to a processor by the platform via a double bit ECC error on the system bus. This type of error is generally corrected by entering the rendezvous state.

The third category of errors are errors that cannot be completely corrected by either the processors or firmware (PAL and SAL) and the offending process needs to be terminated to achieve error containment. These errors are handled by the OS. An example of this type of error is a parity error in the first level data cache. Then this error is detected, the processor cannot prevent the register file from being updated with the bad data. In this case, the firmware will flush the entire first level data cache and the offending process is terminated by the OS if it is a non-critical user or kernel process. A platform can also signal this type of error through a bus error signal assertion. This type of error is generally corrected by entering the rendezvous state.

The fourth category of errors are errors that can not be corrected by the processors 104, platform hardware 105, PAL 101, SAL 102, and OS 103. For these errors, the system will need a reboot and execution can not continue. An example of this type of error is a parity error on any access to a dirty line in a processor cache. These errors may necessitate entering the rendezvous state but are not correctable and require a reboot.

When an error is detected and the detecting processor can not handle the error through hardware means or through an error handling routine in the PAL 101, the detecting processor accesses and executes an error handling routine in the SAL 102. The SAL error handling routine causes the system to enter a rendezvous state. The SAL error handling routine selects a single processor also known as a monarch processor to handle the error and the other processors become idle or enter spin loops.

The monarch processor is one of the plurality of processors 104. The monarch processor can simply be selected as the processor that detected the error. Or, the detecting processor can execute a SAL 102 routine to select a processor to be the monarch processor based on certain criteria. The criteria could be which processor is unaffected by the error or which one can most efficiently correct the error. Lastly, the monarch processor could pre-designated by design or on system startup.

The monarch processor executes an error handling routine to correct the error. The error handling routine may be in firmware, firmware layers such as SAL and PAL, or the OS. Once the error has been handled or corrected by the monarch processor, the system exits the rendezvous state and all processors resume normal operation.

By the plurality of processors 104 utilizing these layers, SAL, PAL, and OS, to handle system errors, the system can operate in a reliable, available and serviceable manner. Errors can be handled before they are encountered by or propagated to other processors. These three layers may have components, modules or software layers within them. Further, the PAL, SAL, and OS layers may have separate logical software components for each processor in a system. These components can be utilized to work cooperatively to accomplish error handling in the rendezvous state.

There can be other layers of software executing in a system besides the firmware and OS 103 layers. These other layers may be running at a highest privilege level. Thus, it is necessary for one of the layers to initiate coordination and the bringing of all the processors in the system to a spin-loop or idle condition. The PAL and SAL firmware layers are closer to the processor and are the layers to coordinate bringing all processors to the rendezvous state. By being closer to the processor they are lower order software that manipulate processor or platform resources directly.

Each of the PAL 101, SAL 102, and OS 103 layers can have a functional module which is responsible for coordinating the rendezvous process. These functional modules are executed on the monarch processor during the rendezvous process. The functional module for PAL 101 is a processor error handler. The functional module for SAL 102 is a platform error handler. The functional module for OS 103 is a machine check handler. The coordination and signaling between the three layers can be done with the help of system interrupts or other appropriate signaling mechanisms which are registered and negotiated by the rendezvous layers. The layers can use a signaling mechanism for communicating the initiation of a rendezvous process and use a second set of signaling mechanisms for marking the end of this rendezvous process. Examples of a signaling mechanisms include interrupts or a semaphore flags in memory.

The error handling routine in PAL 101 initiates a rendezvous process by signaling or accessing SAL 102. The detecting processor uses a routine in SAL to select a monarch processor and to bring all non monarch processors to a rendezvous state. SAL 102 can inform the OS 103 layer of the request for rendezvous state. The OS 103 can then inform SAL 102 that it is ready to enter rendezvous state and tells SAL 102 to enter the rendezvous state. As stated above, the layers may inform each other by using interrupts. Once the system has entered the rendezvous state, a monarch processor takes control of handling the error. The monarch processor may handle the error on its own or it may implement a routine from the PAL 101, SAL, or OS layer to handle the error. Once the error has been corrected, the OS is informed that the error has been corrected. The OS can inform all processors to get out of rendezvous state. The OS may inform the processors to get out of rendezvous state by using an interrupt. At that point, the system resumes normal operation.

Figure 2:
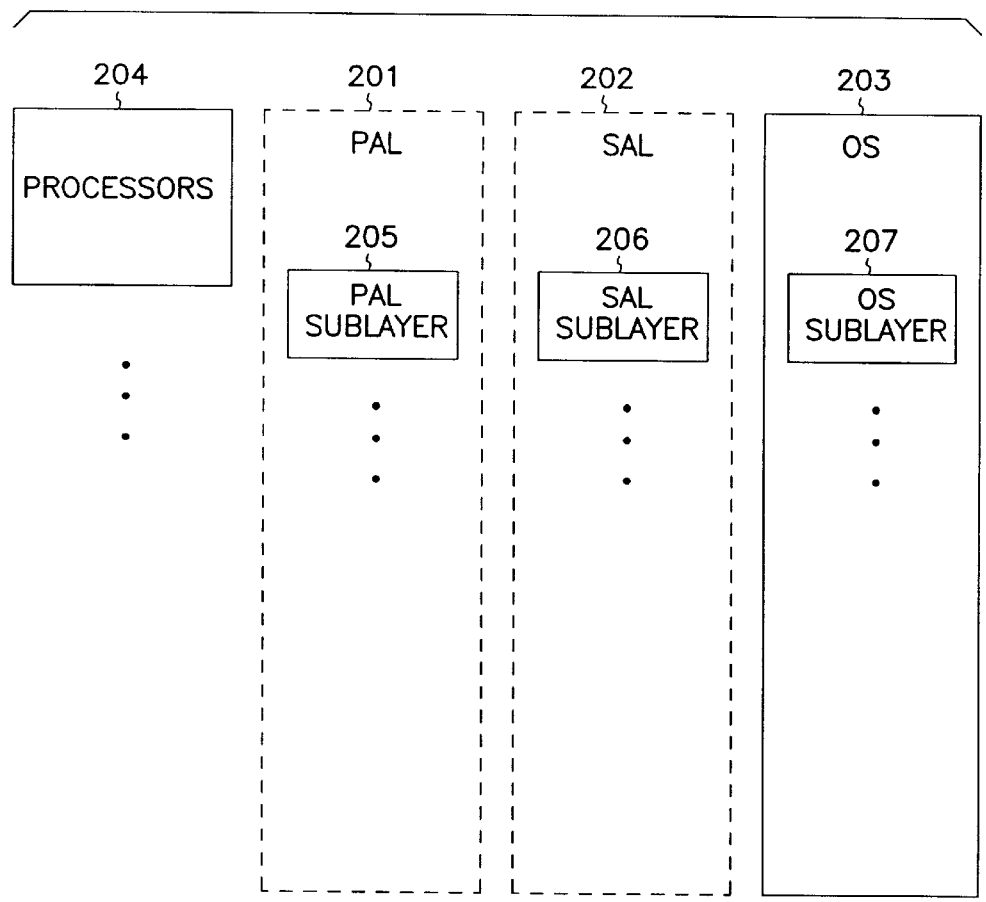
FIG. 2 illustrates a system for error handling according to one embodiment of the present invention.

FIG. 2 shows a system for error handling according to an embodiment of the present invention. This system includes a plurality of processors 204, a PAL (processor abstraction layer) 201, a SAL (system abstraction layer) 202, and an OS (operating system) 203 layer. The plurality of processors may be any type of processor or microprocessor. Each processor has a corresponding PAL sublayer 205 and SAL sublayer 206 that are executed or running on that processor. Each processor also has an OS sublayer 207 executed or running on that processor. One of the plurality of processors operates as a monarch processor and the others can operate as slave processors during error handling. The monarch processor may be initially assigned by the system or may be chosen each time it is desired that the system enter a rendezvous state. In the following discussion, we refer to PAL, SAL sublayers with the understanding that they represent PAL or SAL code executed by a particular processor.

As stated, the PAL 201 layer has a separate PAL sublayer 205 for each processor, and PAL sublayer 205 is connected to each processor. The PAL sublayers 205 can include a rendezvous component so that when the system enters the rendezvous state, the corresponding processor can execute that component to enter a rendezvous state by entering into a spin loop or idle state. The PAL sublayer 205 for the monarch processor, however, does not enter an idle state and is executed by the monarch processor to provide error handling. The PAL sublayer 205 on the monarch processor may be called a processor error handler.

The SAL 202 has a separate sublayer for each processor. The SAL sublayer 206 is connected to each PAL sublayer and each can access routines or procedures in each other. The SAL sublayers 206 can include a rendezvous component so that when the system enters the rendezvous state, the corresponding processor executes the rendezvous component to enter a rendezvous state by entering into an idle loop. The SAL sublayer for the monarch processor does not enter the rendezvous state. The SAL sublayer for the monarch processor provides error handling and is also called a platform error handler.

The OS 103 layer has a separate OS sublayer 207 for each processor. The OS sublayer 207 is connected to a SAL sublayer 206 and each can access routines or procedures in each other.

Each processor has a corresponding PAL sublayer 205, SAL sublayer 206 and an OS sublayer 207. Together, the PAL sublayer 205, SAL sublayer 206 and OS sublayer 207 on the monarch processor are executed by the monarch processor and handle the error.

The OS sublayer 207 executing on the monarch processor may also be called a machine check handler.

After an error has been detected by a processor, the processor executes the PAL sublayer 205, and determines the severity of the error and depending on the severity, may request the system enter a rendezvous state. The PAL sublayer 205 signals the SAL sublayer 206 a request to enter the rendezvous state. The SAL sublayer 206 informs the OS sublayer 207 of the request. The SAL sublayer 207 signals other SAL sublayers to enter the rendezvous state. These other SAL sublayers signal corresponding PAL sublayers which in turn signal the corresponding processors. Once the system has entered the rendezvous state, the PAL sublayer 205, SAL sublayer 206, and OS sublayer 207 executing on the monarch processor handle the error. Once the error is handled, the PAL sublayer 205, SAL sublayer 206, and OS sublayer 207 executing on the monarch processor wake up the other sublayers and processors.

Figure 3:
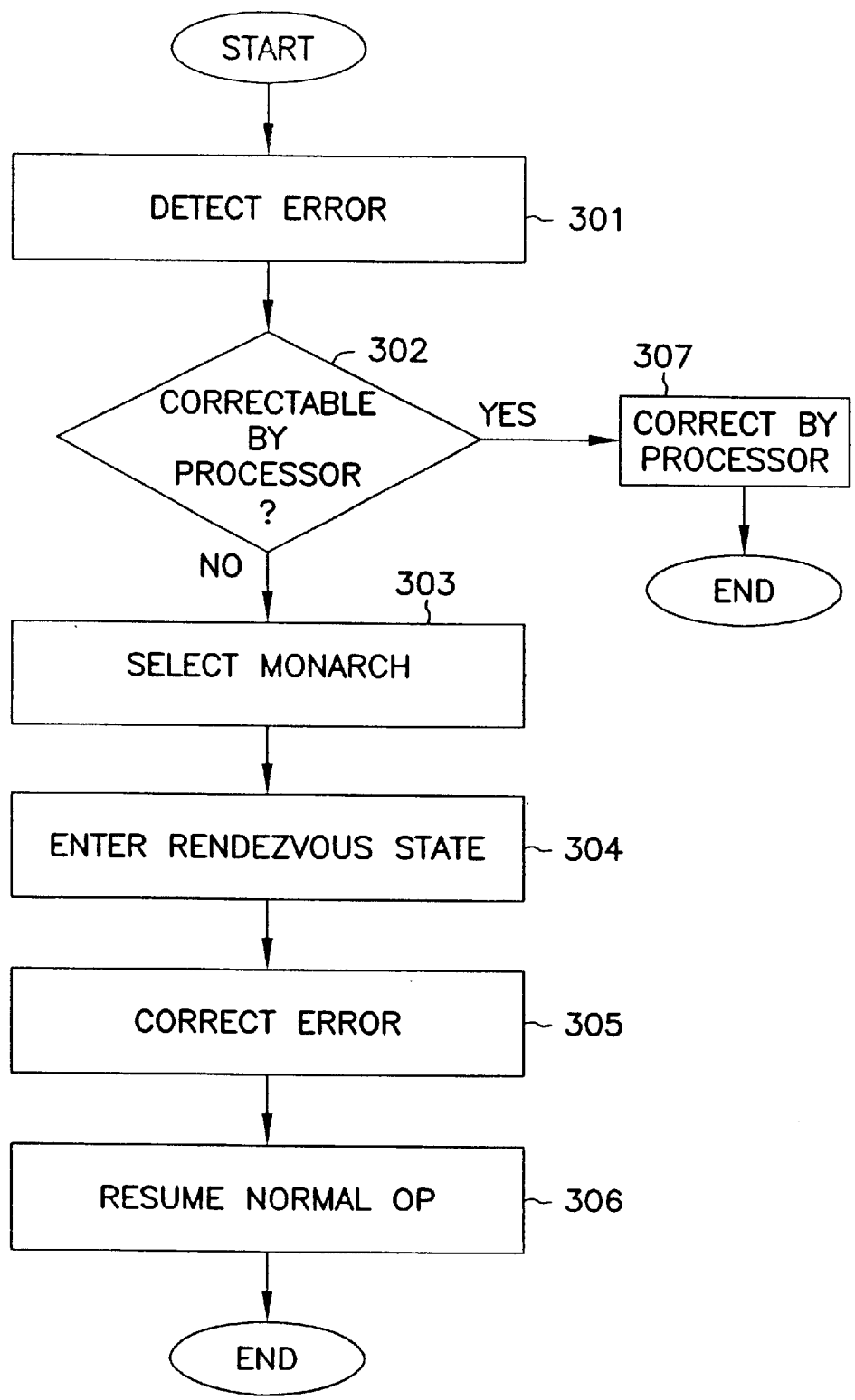
FIG. 3 illustrates a method for handling errors according to one embodiment of the present invention.

Referring to FIG. 3, a method for handling errors is illustrated. An error is detected at 301. The error may be detected by a processor or other platform hardware. A determination is made as to whether the error is correctable by the processor 302. If the error is correctable by the processor, the processor may correct the error on its own i.e. using processor hardware or it may access an error handling routine in PAL 307. If the error is severe or not correctable by the processor, the processor requests that the system enter a rendezvous state 302.

There are several types of errors that may occur. One type of error that may occur is a processor correctable error such as a single bit error in the processor cache that is corrected by processor hardware. Generally, processor correctable errors are not severe errors and do not necessitate entering the rendezvous state. Another type of error is one that is correctable by firmware layers such as a parity error in the processor instruction cache. In this case, the PAL or SAL can invalidate the entire instruction cache to correct the error. Another type of error is one correctable by the OS. An example of this is a parity error in a data cache which causes faulty data. The OS can correct this error by terminating the process creating the faulty data. The last type of error is one that cannot be corrected by the processor, the PAL, the SAL or the OS. The system can be rebooted to correct the error.

A single processor of the plurality of processors is selected as a monarch processor to handle the error in the rendezvous state 303. The monarch processor may be selected as the processor that detected the error or by some selection criteria. In alternate embodiments, the monarch processor is designated and thus there is no need to select a monarch processor.

The system enters the rendezvous state at 304. While in the rendezvous state, all processors in the system except the monarch processor enter an idle state. The idle state may simply comprise executing a spin loop with the processor. The processors may notify the PAL, the SAL and the OS layers when they have entered into the idle state. When all processors except the monarch processor have entered into the idle state, the system is in a rendezvous state.

The error is corrected at 305. The error may be corrected by the monarch processor using routines from the PAL, SAL or OS layer. Once the error is corrected, the system can resume normal operation at 304. This can be accomplished by sending a signal or interrupt to the processors to "wake up" from their idle state and resume normal operation. If the error is not corrected, the system may have to be restarted.

Figure 4:
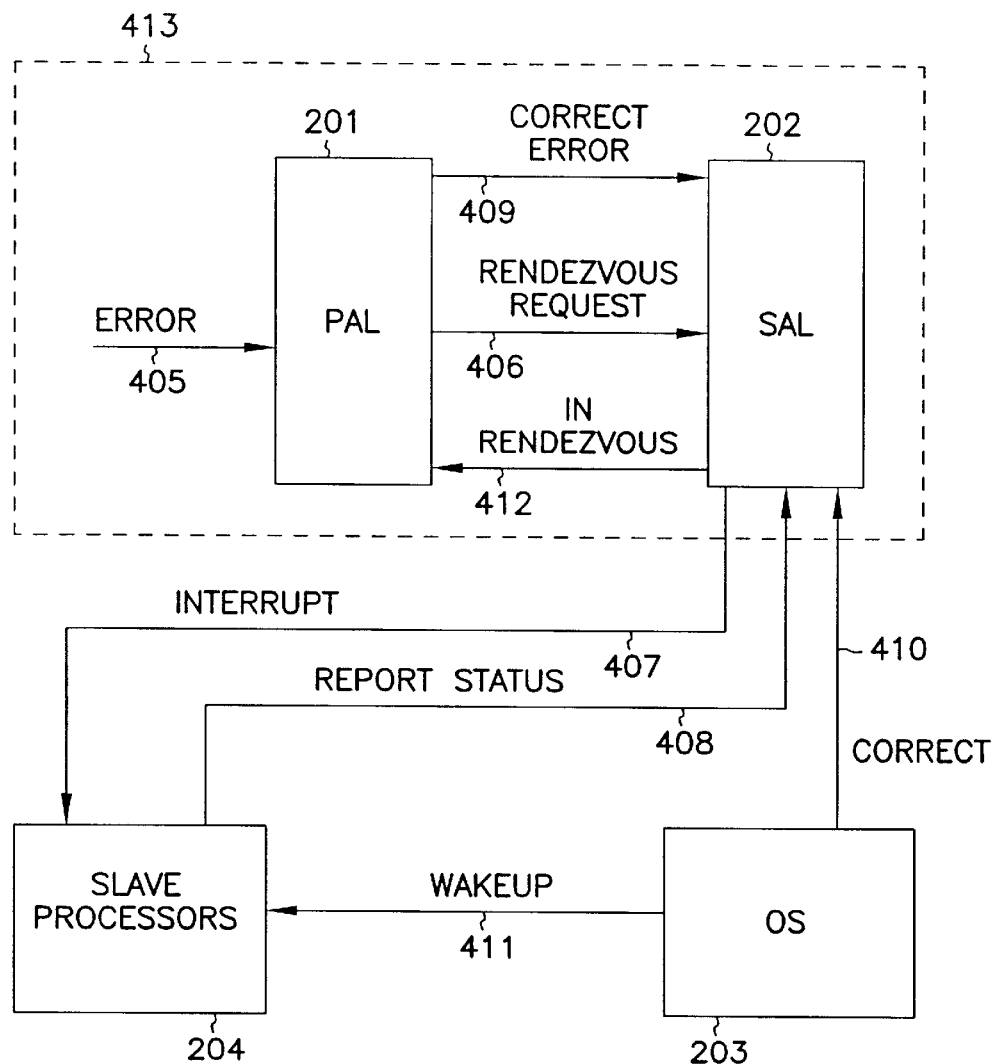
FIG. 4 illustrates a block diagram representing how different components of the system are engaged to handle errors.

Referring to FIG. 4, a block diagram representing how different components of the system are engaged to handle errors. In the following discussion, we refer to PAL, SAL, and OS with the understanding that they represent PAL, SAL, or OS code executed by a particular processor. An error is detected by a processor and an error signal 405 is provided to PAL 201. A processor or hardware component in the system may detect the error. The processor attempts to correct the error by utilizing platform hardware and accessing PAL 201 routines.

The PAL sends a rendezvous request 406 to SAL 202 if the processor failed to correct or handle the error. The rendezvous request can be a signal or interrupt requesting that the system enter the rendezvous state. The SAL sends an interrupt signal 407 to slave processors 204. The slave processors are all the processors in the system except the monarch processor. Generally, all processors except the monarch processor are slave processors. The slave processors enter an idle state.

The slave processors report their status to the SAL 408. The status should be that the slave processors have entered idle state. If one or more of the slave processors fail to enter idle states, they may try again or force the system to shutdown. If the slave processors have entered idle states, the system has entered the rendezvous state. Once the system is in the rendezvous state, SAL informs the PAL that the system has entered rendezvous state via signal 412. While in the rendezvous state, SAL, PAL, and OS are executed by the monarch processor.

The PAL can attempt to correct the error and inform the SAL of its success or failure using signal 409. Alternately, the PAL may request the monarch processor correct the error. If the PAL successfully corrects the error, PAL or SAL can inform the OS that the error has been corrected. If PAL fails to correct the error, SAL may attempt to correct the error and provide a correct signal 410 to inform OS of success or failure. If the SAL fails to correct the error, the OS can attempt to correct the error. If the OS is unable to correct the error, the system can be shutdown. If the error has been successfully corrected, the OS can send a "wake up" signal 411 to the slave processors. All the processors can then continue performing the tasks they were performing before entering the rendezvous state.

Figure 5:
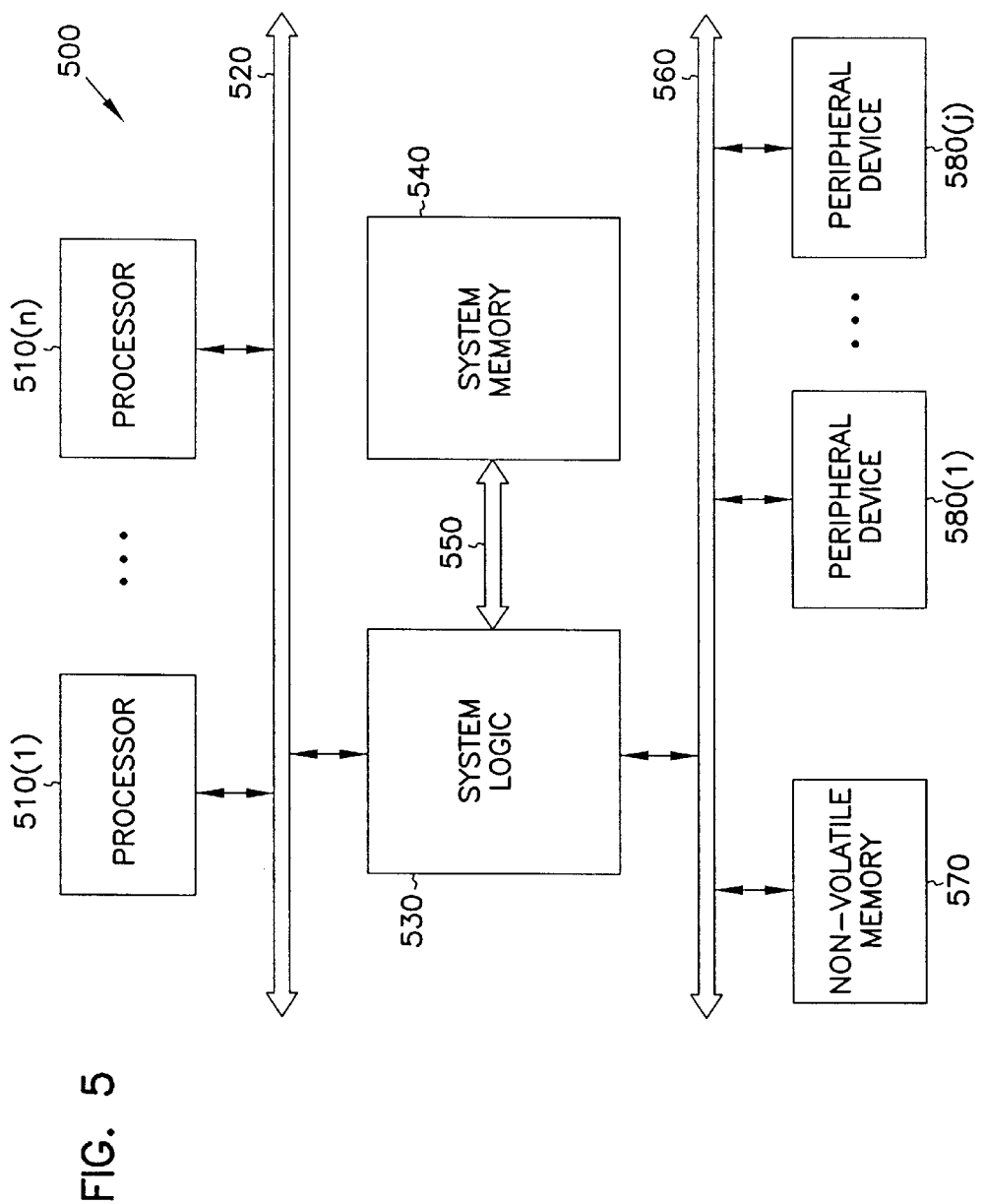
FIG. 5 illustrates a computer system suitable for implementing the present invention.

FIG. 5 is a block diagram of one embodiment of a computer system 500 that is suitable for implementing the present invention. The disclosed embodiment of computer system 500 includes a plurality of processors 510 that are coupled to system logic 530 through a processor bus 520. A system memory 540 is coupled to system logic 120 through bus 550. A non-volatile memory 570 and one or more peripheral devices 580(l)-580(j) (collectively, devices 180) are coupled to system logic 530 through peripheral bus 560. Peripheral bus 560 represents, for example, one or more peripheral component interconnect (PCI) buses, industry standard architecture (ISA) buses, extended ISA (EISA) buses, and comparable peripheral buses. Non-volatile memory 570 may be a static memory device such as a read only memory (ROM) or flash memory. Peripheral devices 580 include, for example, a keyboard, mouse or other pointing devices, mass storage devices such as hard drives and digital video discs (DVD), a display, and the like. These devices, together with system logic 530 define the computing platform for system 500.

For the disclosed embodiment of system 500, processors 510 may execute code or routines stored in system memory 540. The code for the operating system (OS) is in the system memory 540. The processor also executes code from the non-volatile memory 570. The firmware including PAL and SAL can be located in the non-volatile memory.

The various embodiments described above and other variations permit better error handling in multiprocessor systems. These embodiments can extend to networked systems or distributed systems. Error handling on a multiprocessor system can be performed similar to error handling on single processor systems. By handling system errors better, other software can be developed with less regard for possible errors. Errors propagated from other errors can be reduced in number because errors can be handled before encountered by other processors. Software developers can focus more on features and new developments for their products with the resources saved by better error handling in the system. Computer users can notice improved performances in systems, less system shutdowns and reboots, less data loss from unexpected shutdowns and time saved by having a computer system that is more stable.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefor, it is manifestly intended that this invention be limited only by the following claims and equivalents thereof.

What is claimed is:

1. A method comprising:

detecting an error;

sending a rendezvous request from a processor abstraction layer to a system abstraction layer;

sending an interrupt signal from the system abstraction layer to slave processors;

sending a report status from, the slave processors to the system abstraction layer;

sending a report status from the system abstraction layer to the processor abstraction layer;

upon rendezvous status, attempting to correct the error by the processor abstraction layer and informing the system abstraction layer of success or failure in correcting the error;

upon success by the processor abstraction layer, informing operating system of the correction;

upon failure by the processor abstraction layer, attempting to correct the error by the system abstraction layer and informing the operating system of success or failure;

upon success by the system abstraction layer, sending a wake up signal from the operating system to the slave processors;

upon failure by the system abstraction layer, attempting to correct the earn by the operating system;

upon success by the operating system, sending a wake up signal from the operating system to the slave processors; and upon failure by the operating system, initiating system reboot.

2. The method of claim 1, further comprising determining a severity of the error and only sending a rendezvous request upon the error being severe.

3. The method of claim 1, further comprising:

selecting a monarch processor to send the wake up signal from the operating system to the slave processors.

4. The method of claim 1, wherein a monarch processor is selected after detecting the error.

5. The method of claim 1, wherein a processor that detected the error is selected to be a monarch processor.

6. The method of claim 1, wherein the rendezvous status comprises:

executing a spin loop by at least one of the slave processor.

7. The method of claim 1, further comprising:

notifying the system abstraction layer that the rendezvous status has been entered by at least one of the slave processors.

8. The method of claim 1, further comprising:

executing the processor abstraction layer on a monarch processor.

9. The method of claim 1, further comprising:

correcting the error using a monarch processor.

10. An article comprising a machine-accessible medium having associated data, wherein the data, when accessed, results in a machine performing:

detecting an error, sending a rendezvous request from a processor abstraction layer to a system abstraction layer;

sending an interrupt signal from the system abstraction layer to slave processors;

sending a report status from the slave processors to the system abstraction layer;

sending a report status from the system abstraction layer to the processor abstraction layer;

upon rendezvous status, attempting to correct the error by the processor abstraction layer and informing the system abstraction layer of success or failure in correcting the error, upon success by the processor abstraction layer, informing operating system of the correction;

upon failure by the processor abstraction layer, attempting to correct the error by the system abstraction layer and informing the operating system of success or failure;

upon success by the system abstraction layer, sending a wake up signal from the operating system to the slave processors;

upon failure by the system abstraction layer, attempting to correct the error by the operating system;

upon success by the operating system, sending a wake up signal from the operating system to the slave processors; and upon failure by the operating system, initiating a system reboot.

11. The article of claim 10, wherein the data, when accessed, results in the machine performing:

selecting a monarch processor using a selection criteria.

12. The article of claim 10, wherein the data, when accessed, results in the machine performing:

determining a monarch processor prior to detecting the error.

13. The article of claim 10, wherein the data, when accessed, results in the machine performing:

detecting the error with a hardware component.

14. The article of claim 10, wherein the data, when accessed, results in the machine performing:

forcing a system shutdown if at least one of the slave processors fails to enter the rendezvous status.

15. The article of claim 10, wherein the data, when accessed, results in the machine performing:

notifying the processor abstraction layer that the rendezvous status has been entered by at least one of the slave processors.

16. The article of claim 10, wherein the data, when accessed, results in the machine performing:

notifying the operating system that the rendezvous status has been entered by at least one of the slave processors.

17. The article of claim 10, wherein the data, when accessed, results in the machine performing:

determining a severity of the error.

18. The article of claim 17, wherein the severity of the error is selected from a group including processor-correctable errors, firmware layer-correctable errors, operating system-correctable errors, and uncorrectable errors.

* * * * *

UNITED STATES PATENT AND TRADEMARK OFFICE
CERTIFICATE OF CORRECTION

PATENT NO. : 6,675,324 B2
DATED : January 6, 2004
INVENTOR(S) : Marisetty et al.

It is certified that error appears in the above-identified patent and that said Letters Patent is hereby corrected as shown below:

Column 9,
Line 57, after "from" delete ",".

Column 10,
Line 8, delete "earn" and insert -- error --, therefor.
Line 12, after "initiating" insert -- a --.
Lines 27-28, delete "processor" and insert -- processors --, therefor.
Line 54, delete "," and insert -- ; --, therefor.

Signed and Sealed this

Twenty-seventh Day of July, 2004

JON W. DUDAS
*Acting Director of the United States Patent and Trademark Office*